Patented Oct. 31, 1933

1,933,271

UNITED STATES PATENT OFFICE 1,933,271

INSULATING CEMENT

Adolph V. Leun and Leo H. Roffe, Bethlehem, Pa., assignors to Bethlehem Steel Company, a corporation of Pennsylvania No Drawing. Application December 11, 1931
Serial No. 580,488

3 Claims. (Cl. 106—18)

Our invention relates to a composition of matter having a low thermal conductivity which when in a plastic state may be readily applied to metal or ceramic surfaces.

The major object of our invention is to provide a material which when spread upon a surface to be insulated will adhere firmly thereto and harden to form a unitary covering of high insulating value. A further object is to provide a composition which when it has served its purpose in one application may be removed, brought to a plastic state again and reapplied without appreciable loss of its original insulating and adhesive qualities.

The essential constituents of our insulating cement are: An insulating body of mineral fibres, a binder for said fibres, and a plasticizer. For the major part of the insulating body we prefer to use slag wool on account of its high insulating value and cheapness. To this as a base we add from 15 to 20% of its weight of asbestos fibre which increases the coherence of the fibrous mass. As a binder for the fibrous body and as an adhesive to promote attachment to surfaces to be insulated we use clay. It is desirable that the clay binder be as plastic and unctuous as possible—these properties being commonly referred to as fatness. It has been found however that a clay that is too fat will cause cracking when the coating hardens and we therefore limit the fatness to that which permits of a sound coating by mixing a very fat clay such as bentonite with a modifying leaner clay. To increase the plasticity of the mass we add a small amount of sodium carbonate.

The preferred formula for the cement is as follows:

|  | Per cent |
| --- | --- |
| Slag wool | 73 |
| Long fibered asbestos | 13 |
| Bentonite | 6 |
| Medium fat clay | 7 |
| Anhydrous sodium carbonate | 1 |

From the above outline of the functions of the various components it will be evident that this preferred composition may be altered to some extent to suit the properties of the available materials and the use to which the cement is to be put. For example, we have found that the proportions of slag wool and asbestos may be altered within wide limits provided the asbestos content does not fall below about 10%. The total clay constituent may vary from 10% to 25% and a single clay of the necessary fatness may of course be substituted for the mixture above referred to. The proportion of sodium carbonate may vary from one half per cent to 2 or 3% although we have found 1% to be fully effective and less damaging to the hands of the workman who applies it than the higher percentages.

The constituents of the cement are mixed in the dry state by tumbling or pugging and the product in this form can be kept indefinitely. For application it is mixed with enough water to form a thin putty and is thrown or trowled onto the surface to be insulated. When the surface to which it is to be applied is hot it has been found beneficial to use more water than for a cold surface.

One of the main uses of a cement of this kind is to cover the surface of brickwork in certain parts of furnaces and ovens and to stop up openings in the brickwork. Since much of the brickwork in certain types of furnaces is of a relatively temporary character, it may result in considerable economy if the cement applied to same can be recovered when the brickwork is torn down. We find that our cement (unless it has been subjected to a sintering temperature) can be restored to practically its original plasticity and adhesiveness by simply adding water and kneading it.

Having thus described our invention what we claim as new and desire to secure by Letters Patent is:

1. An insulating cement composed of slag wool, asbestos fibre, bentonite, a modifying clay and sodium carbonate.

2. An insulating cement containing from about 75% to about 90% of a mixture of slag wool and asbestos fibre containing at least 10% of the latter, from about 24% to about 9% of a mixture of bentonite and a modifying clay of which the bentonite does not exceed 75%, and from about ½% to about 3% of sodium carbonate.

3. An insulating cement containing 73% slag wool, 13% asbestos fibre, 6% bentonite, 7% modifying clay and 1% anhydrous sodium carbonate.

ADOLPH V. LEUN.
LEO H. ROFFE.